(12) United States Patent
Patel et al.

(10) Patent No.: US 8,493,993 B2
(45) Date of Patent: Jul. 23, 2013

(54) DUTY CYCLING TECHNIQUES IN MEDIUM ACCESS CONTROL (MAC) PROTOCOLS FOR BODY AREA NETWORKS

(75) Inventors: Maulin D. Patel, Tuckahoe, NY (US); Carlos M. Cordeiro, Portland, OR (US)

(73) Assignee: Koninklijke Philips N.V., Eindhoven (NL)

( * ) Notice: Subject to any disclaimer, the term of this patent is extended or adjusted under 35 U.S.C. 154(b) by 186 days.

(21) Appl. No.: 13/058,005

(22) PCT Filed: Aug. 7, 2009

(86) PCT No.: PCT/IB2009/053497
§ 371 (c)(1),
(2), (4) Date: Apr. 6, 2011

(87) PCT Pub. No.: WO2010/018521
PCT Pub. Date: Feb. 18, 2010

(65) Prior Publication Data
US 2011/0182222 A1    Jul. 28, 2011

Related U.S. Application Data

(60) Provisional application No. 61/087,740, filed on Aug. 11, 2008, provisional application No. 61/087,742, filed on Aug. 11, 2008.

(51) Int. Cl.
*H04L 12/413*    (2006.01)
(52) U.S. Cl.
USPC ........................................ 370/445; 370/310.2
(58) Field of Classification Search
USPC ............... 370/310, 310.2, 349, 328, 338, 445
See application file for complete search history.

(56) References Cited

U.S. PATENT DOCUMENTS

| 7,319,903 | B2 * | 1/2008 | Bange et al. | 607/60 |
| 2004/0253996 | A1 | 12/2004 | Chen | |
| 2005/0111369 | A1 | 5/2005 | Mangin | |
| 2006/0135145 | A1 | 6/2006 | Redi | |
| 2009/0046611 | A1 * | 2/2009 | Ryu et al. | 370/311 |

FOREIGN PATENT DOCUMENTS

EP    1657852 A1    5/2006

OTHER PUBLICATIONS

Amre El-Hoiydi et al: "WiseMAC: An Ultra Low Power MAC Protocol for Multi-hop Wireless Sensor Networks" Jun. 22, 2004, Algorithmic Aspects of Wireless Sensor Networks; [Lecture Notes in Computer Science;;LNCS], Springer-Verlag, Berlin/Heidelberg, pp. 18-31 , XP019008766.

(Continued)

*Primary Examiner* — Brenda H Pham
(74) *Attorney, Agent, or Firm* — Larry Liberchuk

(57) ABSTRACT

A medium access control (MAC) duty cycling is carried out in a body area network (BAN). The duty cycling includes sending a wake-up (WUP) message from a sender node to one or more target receiver nodes when a wireless medium of the BAN is free (S510); determining if at least one target receiver node responded with a READY message during a sniff time interval of the sender node (S520); determining if a number of WUP messages transmitted by the sender node exceeds a predefined threshold when the READY message was not received (S540); and setting the sender node to operate in a TURN mode when the number of WUP messages exceeded the predefined threshold (S550).

15 Claims, 7 Drawing Sheets

OTHER PUBLICATIONS

El-Hoiydi et al., "WiseMAC: An Ultra Low Power MAC Protocol for the Downlink of Infrastructure Wireless Sensor Networks" Published in the Proceedings of the Ninth IEEE Symposium on Computers and Communication, ISCC'04, pp. 244-251, Alexandria, Egypt, Jun. 2004.

Joseph Polastre et al.,"Versatile Low Power Media Access for Wireless Sensor Networks", ACM SenSys, Nov. 2004, pp. 95-107.

Michael Buettner et al., "X-MAC: A Short Preamble MAC Protocol for Duty-Cycled Wireless Sensor Networks" ACM SenSys 2006.

* cited by examiner

DUTY CYCLING TECHNIQUES IN MEDIUM ACCESS CONTROL (MAC) PROTOCOLS FOR BODY AREA NETWORKS

This application claims the benefit of U.S. Provisional Application Nos. 61/087,740 and 61/087,742 both filed on Aug. 11, 2008.

The invention generally relates to medium access control (MAC) protocols utilized in wireless networks and, more particularly, to MAC protocols utilized in low power wireless sensor networks, such as body area networks (BANs).

A body area network (BAN) is primarily designed for permanent monitoring and logging of vital signs. An exemplary BAN, as shown in FIG. 1, includes multiple nodes 120 which are typically sensors that can be either wearable or implanted into the human body. The nodes 120 monitor vital body parameters and movements, and communicate with each other over a wireless medium. The nodes 120 can transmit data from a body to one or more devices 130 from where the data can be forwarded, in real-time, to a hospital, clinic or elsewhere over a local area network (LAN), a wide area network (WAN), a cellular network, and the like.

One of the important factors in designing a BAN is the energy efficiency of nodes 120 and/or devices 130. Efficient energy consumption can be achieved by optimally duty cycling a receiver node (i.e., a node receiving data) between a listen state and a sleep state. The radio of a node is turned off (i.e. put in a sleep state) when the node neither transmits nor receives data, thereby saving energy. A duty cycling is performed by a MAC protocol with the aim of minimizing idle listening, overhearing, collisions and controlling overhead that ultimately leads to power savings.

In the related art several synchronous and asynchronous MAC duty cycling techniques are disclosed. A synchronous duty cycling includes periodically advertising sleep and wake-up schedules and synchronizing awake times of receiver nodes. This requires an explicit synchronization mechanism, such as beacons. In an asynchronous duty cycling, a sender node (i.e., a node sending data) and a listener node (i.e., a node listening to the medium) have independent sleep and awake times, and this technique does not require any synchronization mechanism.

A preamble sampling technique is widely used in asynchronous duty cycling MAC protocols, such as WiseMAC, B-MAC and X-MAC. The WiseMAC is further described in "*WiseMAC: An Ultra Low Power MAC Protocol for the Downlink of Infrastructure Wireless Sensor Networks*" by El-Hoiydi, at el. published in the Proceedings of the Ninth IEEE Symposium on Computers and Communication, ISCC'04, pages 244-251, Alexandria, Egypt, June 2004. The B-MAC is described in "*Versatile Low Power Media Access for Wireless Sensor Networks*", ACM SenSys November 2004 by Polastre, at el., and the X-MAC protocol is published in "*X-MAC: A Short Preamble MAC Protocol for Duty-Cycled Wireless Sensor Networks*" ACM SenSys 2006, by Buettner at el.

As illustrated in FIG. 2, in the preamble sampling technique all the nodes periodically listen to the medium for a short duration of time "$T_L$" and then return to a sleep state for the duration of a time "$T_{CI}$" if the medium is idle. The time $T_{CI}$ between two successive listen times $T_L$ is a check interval. The combination of time intervals $T_{CI}+T_L$ is a wake-up time interval. When a sender node has data to deliver, it transmits a wake-up (WUP) message 210 that is longer than the check time interval $T_{CI}$ of a receiver node. In the preamble sampling technique the WUP message 210 carries only preambles and does not carry any other information. When a receiver node wakes-up, it senses the medium and detects the WUP message 210. This forces the receiver node to stay awake until the data is fully received and/or the medium becomes idle again.

The length of the WUP message 210 must be longer than the check interval $T_{CI}$ to ensure that a receiver node is awake when actual data is transmitted. If a check interval $T_{CI}$ of a receiver node is very long, then WUP message transmissions can occupy the medium for a very long time, thereby preventing other nodes from accessing the medium.

Another disadvantage of the current state of the art techniques is illustrated in FIG. 3 describing an exemplary scenario where nodes 300-A, 300-B, 300-C, and 300-D are neighbors in a BAN. In the following scenario, a sender node 300-A tries to send data to a receiver node 300-B, and a sender node 300-C tries to send data to a node receiver 300-D. All the nodes 300-A, 300-B, 300-C, and 300-D are within the transmission and reception range of each other.

At a time $T_1$, the sender node 300-A is ready to send data to the receiver node 300-B, which is scheduled to wake-up at a time $T_4$. During the times $T_1$ to $T_4$ the node 300-A occupies the medium by sending a series of wake-up (WUP) messages 320 to the receiver node 300-B. At a time $T_2$, the sender node 300-C has a data packet ready to be transmitted to the receiver node 300-D. However, the sender node 300-C has to wait for the medium to become idle. The receiver node 300-D wakes up at a time $T_3$ and discovers that it is not among the target receiver nodes, as the potential sender node 300-C is unable to transmit its WUP messages because the medium is occupied by the node 300-A. As a result, the node 300-D returns to a sleep state. Thus, the sender node 300-C missed the opportunity to transmit packets to the receiver node 300-D when the node 300-D woke up, as the medium was occupied by the node 300-A. In addition, the sender node 300-A has to wait a long period of time to deliver data to the node 300-B. This significantly degrades the performance of the BAN MAC protocol causing an increased latency, reduced throughput and increased energy consumption.

Therefore, it would be advantageous to provide an efficient solution for duty cycling MAC protocols.

Certain embodiments of the invention include a method and computer executable code for performing a medium access control (MAC) duty cycling in a body area network (BAN). The method comprises sending a wake-up (WUP) message from a sender node to one or more target receiver nodes when a wireless medium of the BAN is free; determining if at least one target receiver node responded with a READY message during a sniff time interval of the sender node; determining if a number of WUP messages transmitted by the sender node exceeds a predefined threshold, when the READY message was not received; and setting the sender node to operate in a TURN mode when the number of WUP messages exceeded the predefined threshold.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
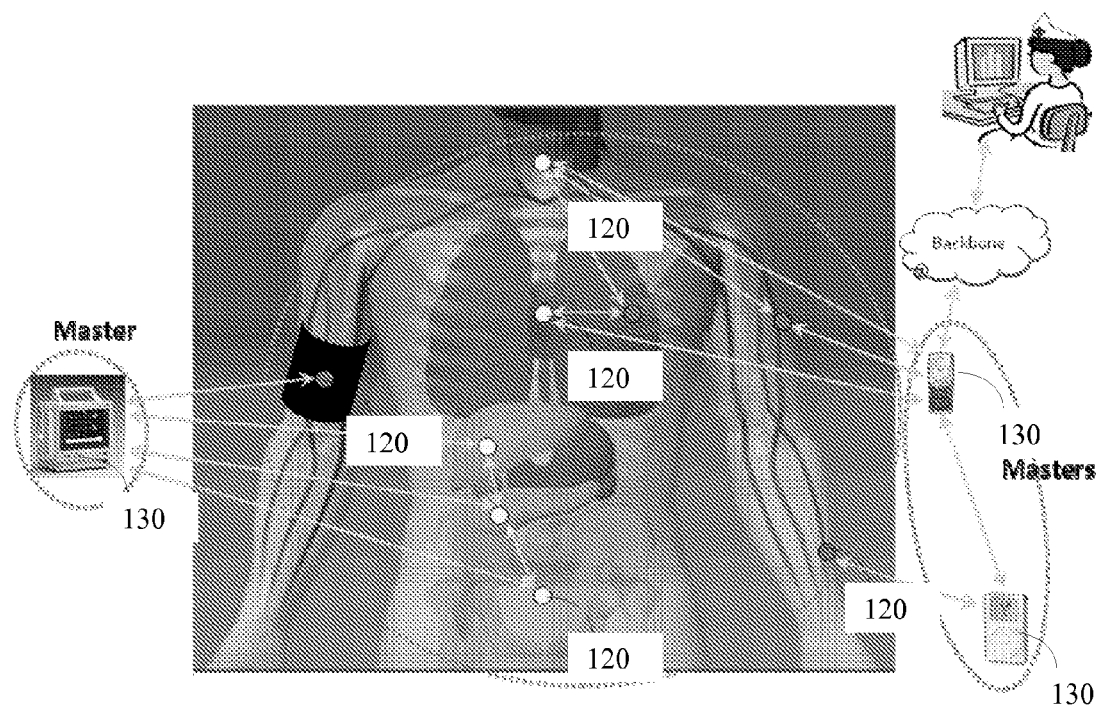
FIG. 1 is a schematic diagram of a body area wireless network.
Figure 2:
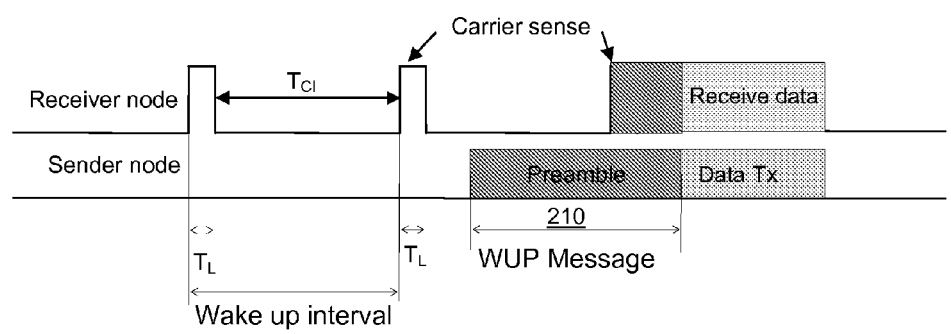
FIG. 2 is a diagram for illustrating the operation of asynchronous duty cycling MAC protocols.
Figure 3:
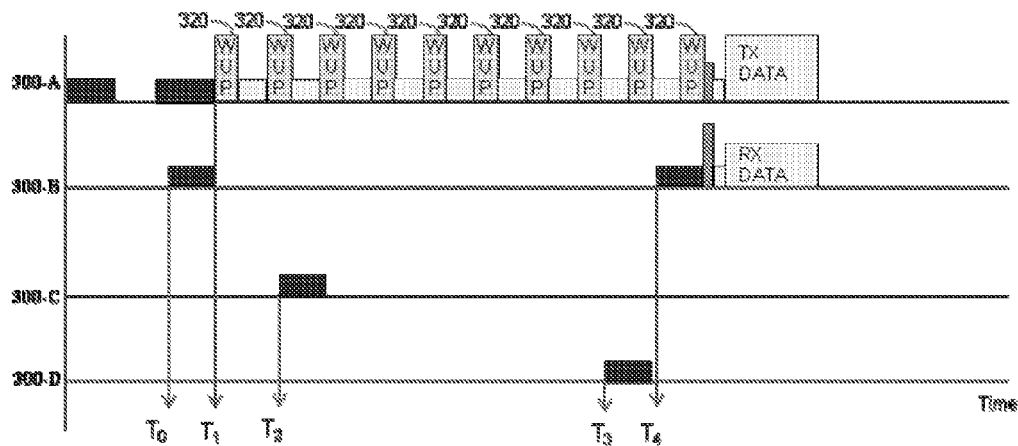
FIG. 3 is a diagram for demonstrating the drawbacks of the asynchronous duty cycling MAC protocols.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 4:
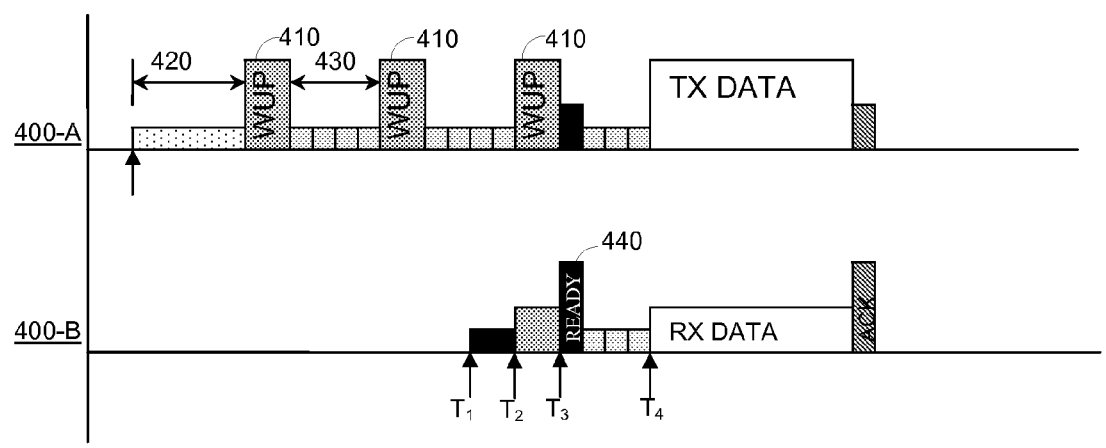
FIG. 4 is a diagram for illustrating the principles of the duty cycling techniques provided in accordance with certain embodiments of the invention.

The proposed protocol is based on wake-up (WUP) messages sent by a sender node to one or more receiver nodes indicating that data is ready to deliver to these nodes. As shown in FIG. 4, prior to sending a WUP message 410, a sender node 400-A listens to the medium for a time period of a snoop interval 420 and after sending a WUP message 410, the sender node listens to the medium for a time period of a sniff interval 430, which includes a fixed predefined number of time slots. In order to prevent systematic collisions of WUP messages of multiple nodes, the sniff interval is randomized. The WUP messages 410 are sent to target receiver nodes, i.e., nodes to which a sender node wants to transmit data packets. In the example provided in FIG. 4, a node 400-B is a receiver node of the sender node 400-A.

The receiver node 400-B wakes up at a scheduled time $T_1$, starts receiving a WUP message 410 at a time $T_2$, and then sends a READY message 440 at a time $T_3$ to the sender node 400-A. In addition, the receiver node 400-B stores an ID and a wake-up time of the sender node 400-A, as well as the current time stamp. The READY message 440 informs the sender node that a receiver node is ready to receive data packets. Subsequently, at a time $T_4$ the receiver node 400-B starts receiving the data transmitted by the sender node 400-A.

It should be noted that wake-up times of the receiver nodes are independent. Furthermore, the wake-up interval of each receiver node is independent and can be dynamically changed. In accordance with an embodiment of the invention the wake-up interval of nodes are selected as follows:

wake-up interval of a node=$2^k$ (minimum wake-up interval), where 0<=k<=Max wake-up interval exponent.

Figure 5:
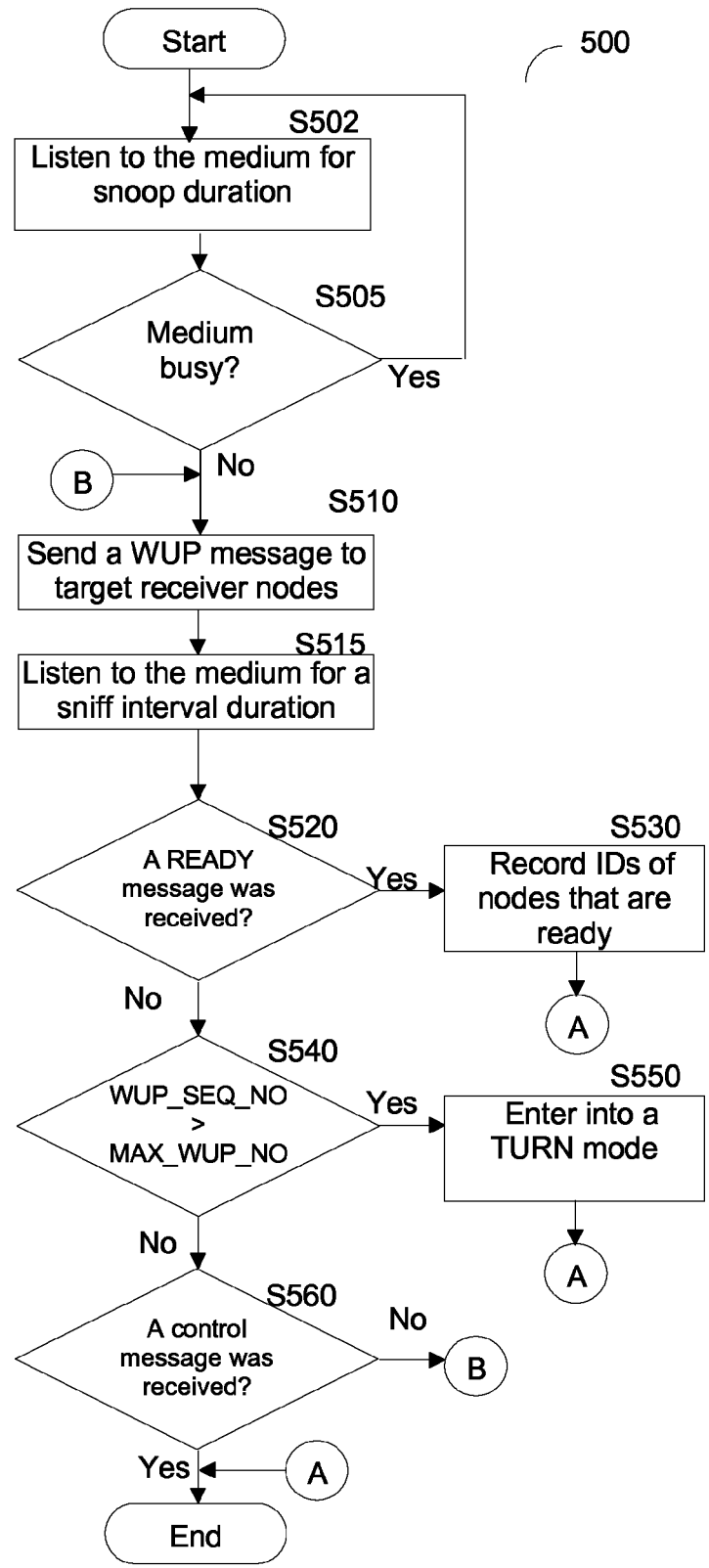
FIG. 5 is a flowchart for describing the duty cycling method implemented in accordance with an embodiment of the invention.

FIG. 5 shows a non-limiting and exemplary flowchart 500 for describing a duty cycling method implemented in accordance with an embodiment of the invention. At S502, a sender node listens to the channel for a snoop interval to determine whether the medium is busy or idle. The snoop interval is longer than a sniff interval to prevent the sender node from falsely concluding that the medium is idle when the medium is busy with ongoing WUP transmissions. At S505, the sender node proceeds with WUP transmissions if the medium is found idle, otherwise it waits until the channel becomes idle.

At S510, a sender node sends a WUP message to inform potential target receiver node(s) that data is ready to be transmitted. The WUP message includes any of the following: an ID of a sender node, a sequence number of the WUP message (the sequence number is incremented after each WUP transmission), a wake-up schedule of the sender node, a bit map or addresses of the target receiver nodes, a bit map of priority levels of pending data packets, slots assigned to target receiver nodes (high priority target receiver nodes are assigned with lower slot numbers), and an expected duration of the data transmission to each of the target receiver nodes.

In accordance with the principles of the invention, the WUP messages also include a TURN SEQUENCE field which specifies which neighbors of a sender node can transmit WUP messages and the order of the transmissions of such messages. The use of the TURN SEQUENCE field will be described in greater detail below. At S515, the sender node listens to the medium for a sniff interval. At S520, the sender node checks, during its sniff interval, if a READY message was received from one or more of the target receiver nodes, and if so at S530, the sender node records the receiver nodes that are ready to receive data packets at the end of the sniff interval.

If no READY messages were received during the sniff interval, execution continues with S540 where another check is made to determine if a WUP sequence number of the last transmitted WUP message is greater than a maximum allowed number of WUP transmissions (the "WUP_MAX" number), and if so, at S550 the sender node is entered into a TURN mode enabling other sender nodes to transmit their WUP messages. As will be described in detail below, the TURN mode can prevent continuous WUP transmissions by a single node.

If S540 results into a "no" answer, execution continues with S560 where another check is made to determine if a special control message was received, and if so execution terminates; otherwise, execution returns to S510 where another WUP message will be transmitted by the sender node. In accordance with one embodiment of the invention, the special control message may be an ABORT message. Such a message may be sent by a potential sender node having a high priority message to transmit data packets which cannot be delivered as the medium is occupied by ongoing WUP transmissions. Upon reception of the ABORT message, the sender node currently transmitting WUP terminates any further transmission of WUP messages and starts listening to the medium.

As discussed above, a TURN mode of a sender node enables other sender nodes to transmit WUP messages according to an order specified in the TURN SEQUENCE field. This process will be described with reference to FIG. 6, where node 600-E is a current sender node which enters in a TURN mode, and a node 600-F is a neighbor sender node requesting to send WUP messages to its target receiver node(s).

When the WUP sequence number of WUP messages sent by the sender nodes 600-E exceeds the WUP_MAX number, the sender node 600-E could be requested by another potential sender node to take turns in transmitting WUP messages by sending a TURN message. In one embodiment, the last slot in a sniff interval is used for transmission of the TURN message. Generally, a sender node 600-F can send a TURN message when the following conditions are satisfied: the sender node 600-F is not among the target receiver nodes of the sender node 600-E; the sender node 600-F is ready to send its WUP messages; a WUP message of the sender node 600-F has at least one non-overlapping target receiver nodes with the sender node 600-E; and the sender node 600-F did not overhear any READY messages in a current sniff interval 605. In addition, to avoid a collision of TURN messages, the sender node 600-F sends a TURN message only when it is eligible. The determination which neighbor node can send a TURN message may be based on the following equation:

Sender(neighbor)node ID=(Current sequence number in WUP–WUP_MAX) % No. of neighbors Here, a sender (neighbor) node ID is assumed to take values from 0 to (number of neighbors–1). Alternatively, each potential sender of TURN messages can determine its eligibility to send TURN messages as follows:

Current sequence number in WUP=WUP_MAX+ Random integer[0,MAX]

Figure 6:
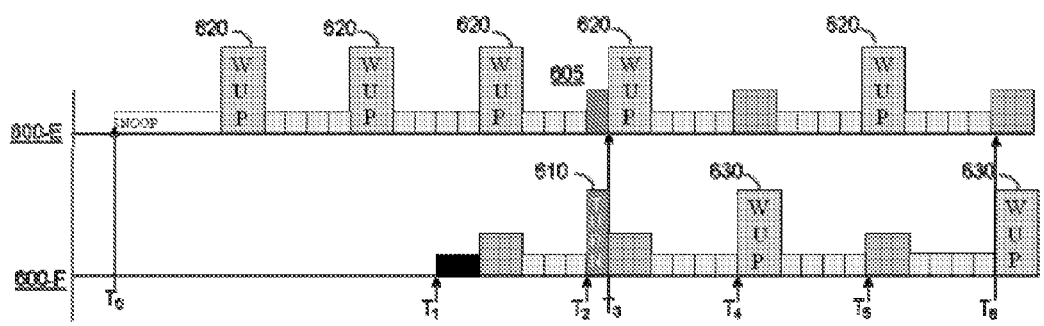
FIG. 6 is a diagram for illustrating the principles of a TURN mode utilized in the duty cycling method implemented in accordance with an embodiment of the invention.

As demonstrated in FIG. 6, at a time $T_1$, the node 600-F is ready to send data. After receiving a WUP message 620 transmitted by the sender node 600-E, the node 600-F determines its eligibility to send TURN message and finds itself eligible. Therefore, at a time $T_2$, a TURN message 610 is generated and transmitted by node 600-F. The sender node 600-E receives the TURN message 610 and determines whether or not to accept the request to send WUP messages by the sender device 600-F. Specifically, the sender node 600-E ignores the TURN message if at least one READY message was received in its current sniff interval 605. If the TURN message request is accepted, the sender node 600-E registers the ID of the node 600-F in the TURN SEQUENCE field. This field specifies which sender nodes in the neighborhood are currently transmitting the WUP messages and the order of their WUP transmissions. If in response to transmission of the WUP message the sender node 600-E gets any READY messages, this node sends its DATA packets and does not allow any transmission of WUP messages by any other nodes.

The transmitter of the TURN message, i.e., the sender node 600-F, listens to the medium to check if any READY messages were sent to the sender node 600-E. If no READY message where overheard, then at a time $T_4$, the sender node 600-F sends its WUP message 630. Thereafter, each of the sender nodes 600-E and 600-F sends a WUP message in its turn (determined by the TURN SEQUENCE field) until at least one READY message was received from either of their respective target receiver node. For example, at times $T_5$ and $T_6$ the sender nodes 600-E and 600-F transmit their WUP messages 620 and 630, respectively.

In another embodiment of the invention a sender node may send WUP messages of other sender nodes in the neighborhood, thereby acting as a proxy for other sender nodes. This embodiment is further described with reference to FIG. 7, where a node 700-A is a sender node requesting to send data to a receiver node 700-X. The node 700-A is also a proxy of WUP messages. A node 700-B is a sender node trying to send data to a receiver node 700-Y.

Starting at a time $T_1$, the sender node 700-A sends WUP messages 710 targeting the receiver node 700-X. At a time $T_2$ the sender node 700-B wants to send WUP messages targeting the receiver node 700-Y. Therefore, at a time $T_3$, during the sniff interval 705, the node 700-B sends a PROXY message 720 to the sender node 700-A. Upon receiving the PROXY message, the sender node 700-A adds the target receiver nodes of node 700-B and other relevant information into its WUP messages 710. Subsequently, all WUP messages 710 that are sent starting at time $T_4$ from the node 700-A targets both target receiver nodes 700-X and 700-Y. If the receiver node 700-X sends a READY message, then the sender node 700-A transmits DATA packets or if the node 700-Y sends a READY message, then node 700-B transmits DATA packets. It should be noted that when the sender node 700-A terminates WUP message transmissions (because it exhausted maximum number of attempts allowed), node 700-B continues to transmit WUP messages.

In accordance with another embodiment of the invention sender nodes can send their WUP messages during the same sniff interval. This allows each sender node, having data to transmit, to send its WUP messages at every wake-up time, and therefore not skip opportunities to send WUP messages when the node is awake. To avoid collisions the sender nodes transmit WUP messages at different time slots of a sniff interval. That is, WUP transmissions are offset in time. This process is further illustrated in FIG. 8, where two sender nodes 800-A and 800-B send WUP messages by taking turns. A sender node 800-B transmits a WUP message 810 at a time $T_1$. At a time $T_2$, a sender node 800-A detects a WUP message from the node 800-B, it reorganizes its sniff interval 805 to accommodate WUP messages of the node 800-B. Hence, during the sniff interval 805 both sender nodes 800-A and 800-B take turns in transmitting WUP messages.

Figure 7:
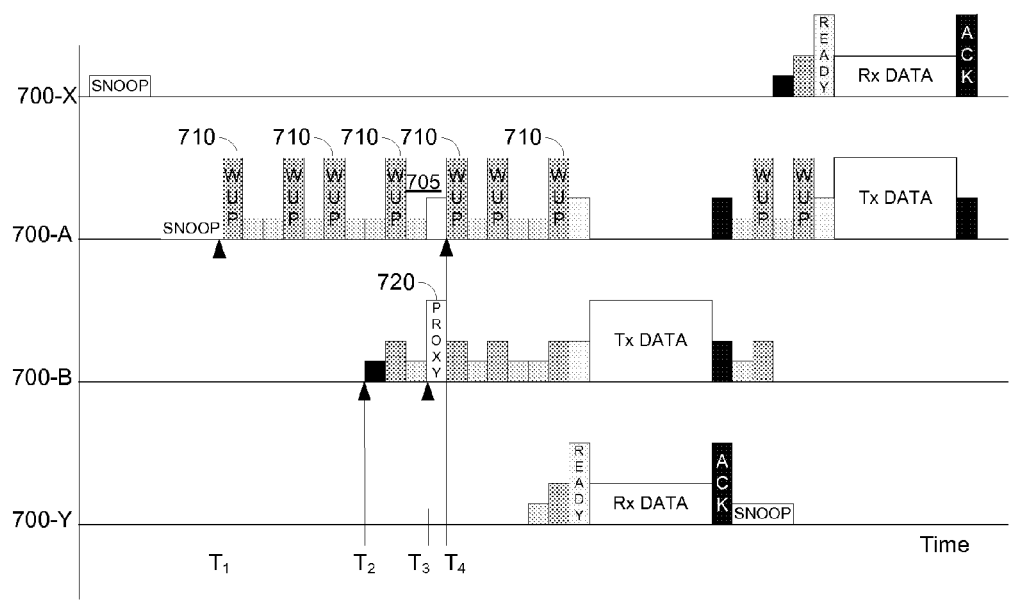
FIGS. 7 and 8 are diagrams for illustrating the principles of techniques for realizing the TURN mode implemented in accordance with certain exemplary embodiments of the invention.
Figure 8:
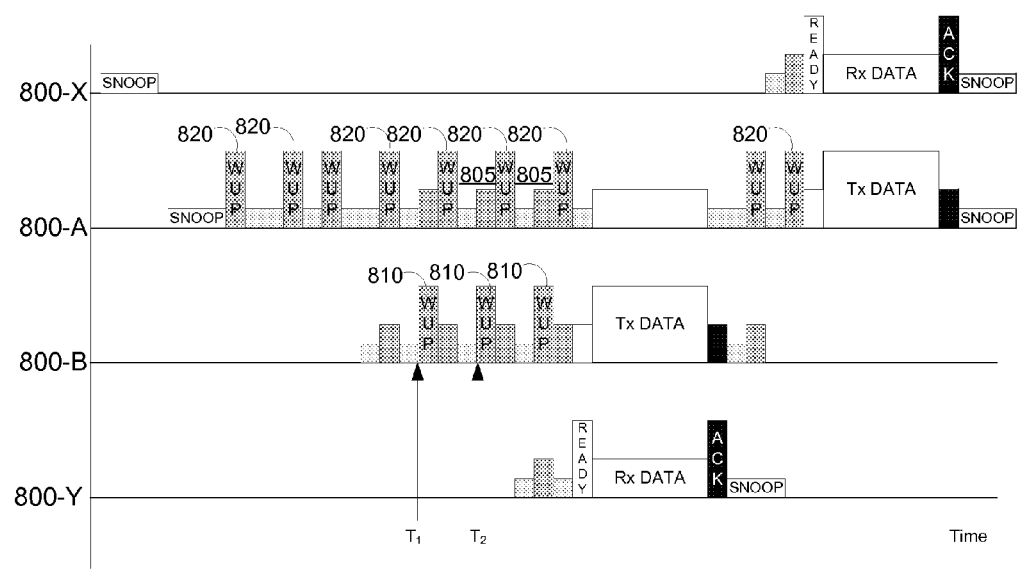

It should be apparent to one of ordinary skill in the art that the processes illustrated in FIGS. 6, 7 and 8 can be implemented by any number of receiver nodes and sender nodes that share the same wireless medium, i.e., neighbor nodes.

It should be appreciated that the duty cycling method together with the TURN mode mechanism described herein can reduce latency, improve throughput and reduce the energy wasted by idle listening, overhearing and over-emitting.

In accordance with an embodiment of the invention, instead of transmitting a WUP message targeting only a single recipient at a time, a sender node can accumulate DATA packets in its queue and then target multiple recipients with a WUP message. Whichever node among the multiple target recipients wakes up sooner can receive the data earlier. By targeting multiple recipients with a single WUP message the head of the queue blocking problem, where the first packet in the queue prevents other packets from being transmitted, can be avoided. Furthermore, frequent wake up of receiver target nodes can be avoided, thereby maximizing energy saving of such nodes. This approach also reduces control overhead and latency and allows supporting quality of service (QoS) priorities.

In another embodiment of the invention when the size of a DATA packet is very small, a WUP and/or READY message can be replaced by the DATA packet. Thus, control overhead of WUP and READY messages can be avoided. Furthermore, when the sender and receiver nodes are tightly synchronized, a sender node can transmit DATA packets directly to the receiver node without transmitting WUP messages. When the traffic load is high, the communicating peers remain tightly synchronized due to frequent scheduled updates piggybacked on ACK packets.

Any overheard message provides an indication that the neighbor is awake. This information is exploited to transmit DATA packets without transmitting WUP message. For example, a pair of communicating nodes remains awake for snoop interval after DATA-ACK sequence. Thus, any neighbor node can transmit DATA packets to either of the nodes after sensing the medium being idle for a random amount of time.

In accordance with another embodiment, a sender node having multiple DATA packets targeted to the same destination can transmit, upon receiving a READY message, all packets in a burst mode, thereby minimizing the WUP overhead. In the burst mode the sender nodes transmit multiple DATA messages back-to-back and receive optional ACK messages. Nodes overhearing WUP or READY messages mark the medium occupied for the entire transmission duration. Packets acknowledgment can be done using either cumulative ACKs or individual ACK to further improve efficiency.

The invention described herein can be further utilized to support broadcast and multicast transmissions in BANs. Specifically, broadcast and/or multicast transmissions are scheduled for a future time and announced via WUP messages. A WUP message indicates the offset of time from a current time when a broadcast/multicast packet would be transmitted. Upon receiving a WUP message a target receiver node records the scheduled broadcast/multicast time and then sleeps until the time arrives. The sender node transmits the broadcast packet at the pre-scheduled time, which is received by target receiver nodes.

If broadcast/multicast packets are small, then a sender node can transmit the broadcast/multicast packets without transmitting WUP messages. This way as the recipient wakes up, it can receive data without the overhead of WUP reception. A sender node can also decide to transmit broadcast/multicast packets as unicast packets, if it would result in saving more energy. For example, if the sender node has only few neighbors and neighbors' snoop times are widely spread over time, then sending unicast messages is an energy efficient approach. Alternatively, the sender node may require ACK for reliability, in which case it must send messages as unicast.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A method (500) for performing a medium access control (MAC) duty cycling in a body area network (BAN), comprising:
   sending a wake-up (WUP) message from a sender node to one or more target receiver nodes when a wireless medium of the BAN is free (S510);
   determining if at least one target receiver node responded with a READY message during a sniff time interval of the sender node (S520);
   determining if a number of WUP messages transmitted by the sender node exceeds a predefined threshold when the READY message was not received (S540); and
   setting the sender node to operate in a TURN mode when the number of WUP messages exceeds the predefined threshold (S550).

2. The method of claim 1, further comprising:
   listening to the medium for a randomly selected sniff interval (S515);
   recoding identification (ID) numbers of target receiver nodes that responded with a READY message (S530); and
   transmitting data packets to each target receiver node that the ID number of the each target receiver is recorded in the sender node.

3. The method of claim 2, further comprising:
   determining whether a special control message was received (S560); and
   terminating transmissions of WUP messages upon receiving the special control message.

4. The method of claim 1, wherein the WUP message includes at least one of an ID of the sender node, a sequence number of the WUP message being incremented after each WUP transmission, a wake up schedule of the sender node, addresses of the target receiver nodes, a bit map of priority levels of pending data packets, time slots assigned to the target receiver nodes, an expected duration of the data transmission to each of the target receiver nodes, and a TURN SEQUENCE field.

5. The method of claim 4, wherein the TURN SEQUENCE field specifies which neighboring nodes of the sender node can transmit WUP messages and an order in which WUP messages should be sent during the TURN mode.

6. The method of claim 1, wherein the TURN mode prevents continuous WUP transmissions by a single sender node.

7. The method of claim 6, wherein operations performed by the sender node during the TURN mode further includes:
   receiving a TURN message sent from at least one neighboring node of the sender node, wherein the TURN message is a request to transmit WUP messages by the at least one neighboring node;
   determining whether to accept the TURN message;
   recoding an ID of the at least one neighboring node in the TURN SEQUENCE field of the sender noted when the TURN message is accepted, such that both the sender node and the neighboring node can transmit WUP messages according to an order designated in the TURN SEQUENCE field.

8. The method of claim 7, wherein a neighboring node generates and transmits the TURN message when the following conditions are satisfied: the neighboring node is not among the target receiver nodes of the sender node; the neighboring node is ready to send its WUP messages; a WUP message of the neighboring node has at least one non-overlapping target receiver nodes with the sender node; and the neighboring node did not overhear any READY messages during a current sniff interval of the sender node.

9. The method of claim 7, wherein the sender node accepts the TURN message when no READY messages were received during a current sniff interval of the sender node.

10. The method of claim 7, further comprising sending WUP messages, by the sender node, of the at least one neighboring node, such that the sender node acts as a proxy for the at least one neighboring node.

11. The method of claim 10, further comprising:
    receiving a PROXY message sent from the at least one neighboring node;
    adding at least target receiver nodes of the at least one neighboring node into all WUP messages transmitted by the sender node; and
    transmitting the WUP messages to target receiver devices of both the at least one neighboring node and the sender node.

12. The method of claim 7, further comprising enabling both the at least one neighboring node and the sender node to transmit their WUP messages at different time slots of a sniff interval, wherein the sniff interval is a time interval between two consecutive WUP messages.

13. The method of claim 2, further comprising:
accumulating data packets targeted to multiple recipients with a WUP message and performing at least one of the following steps:
sending the data packets as a stream to a single target receiver node in a burst mode; and
sending the data packets without the WUP message when the data packets are small or the sender node is aware of a wake up time of the receiver the receiver node.

14. The method of claim 2, wherein data packets can be either broadcast or multicast to target receiver nodes recorded in the sender node.

15. A non-transitory computer readable medium having stored thereon computer executable code, when executed, causing a processor to perform a medium access control (MAC) duty cycling in a body area network (BAN), comprising:
sending a wake-up (WUP) message from a sender node to one or more target receiver nodes when a wireless medium of the BAN is free (S510);
determining if at least one target receiver node responded with a READY message during a sniff time interval of the sender node (S520);
determining if a number of WUP messages transmitted by the sender node exceeds a predefined threshold when the READY message was not received (S540); and
setting the sender node to operate in a TURN mode when the number of WUP messages exceeded the predefined threshold (S550).

\* \* \* \* \*